Feb. 5, 1963  M. LOPES  3,076,332
ENGINE OPERATION ANALYSIS APPARATUS
Filed May 29, 1959  5 Sheets-Sheet 1

Feb. 5, 1963 M. LOPES 3,076,332
ENGINE OPERATION ANALYSIS APPARATUS
Filed May 29, 1959 5 Sheets-Sheet 4

Feb. 5, 1963  M. LOPES  3,076,332
ENGINE OPERATION ANALYSIS APPARATUS
Filed May 29, 1959  5 Sheets-Sheet 5

United States Patent Office 3,076,332
Patented Feb. 5, 1963

3,076,332
ENGINE OPERATION ANALYSIS APPARATUS
Marcel Lopes, 32 Bis Rue de la Courneuve,
Aubervilliers, France
Filed May 29, 1959, Ser. No. 816,965
Claims priority, application France May 30, 1958
5 Claims. (Cl. 73—116)

This invention relates generally to engine analysis and adjustment apparatus and, more particularly, to an apparatus for simultaneously checking ignition and valve timing on cyclically operable internal combustion engines.

It is well known that in order to obtain maximum efficiency of an internal combustion engine it is necessary to have, in spark-ignition engines, the proper spark advance and intake and exhaust valve timing. In compression-ignition engines or diesel cycle engines, optimum efficiency is arrived at by properly timing the intake and exhaust valves so as to properly carry out scavenging and other functions.

For maximum efficiency all the air-fuel mixture or charge should be burned while the piston is at the dead center and since combustion requires appreciable time, the spark advance in spark-ignition engines should distribute the combustion process before and after top center in order to obtain maximum power. It is readily apparent, therefore, that in properly servicing an engine, it is essential to be able to control or adjust ignition-timing and valve-timing with respect to particular positions of the pistons in their cylinders during their operational strokes. Accordingly, it is necessary in properly adjusting an engine that the exact position of the pistons be known to properly adjust the optimum spark advance and intake and exhaust valve opening and closing and any overlap thereof.

It is a principal object of the present invention to provide an apparatus for simultaneously checking ignition-timing and intake and exhaust valve-timing while simultaneously knowing the exact position of the corresponding piston so as to properly adjust the two timing functions.

Another object of the invention is to provide a simple and inexpensive apparatus of the aforementioned type which is easy to manufacture and, consequently, inexpensive.

Still another object of the present invention is to provide an apparatus in which the operator has visual indication of the exact position of the piston during its operational cycle and visual indication of the ignition and valve-timing functions or the intervals thereof in order to allow ease of regulation and adjustment of an engine.

A feature of the apparatus according to the invention is the fact that the movement of the piston is mechanically sensed throughout its full stroke thereby allowing for indicating precisely at all times its exact position. The apparatus is provided with a valve-timing device having an ignition timing-light for indicating the exact intervals of time at which an ignition spark would be provided to a cylinder being checked and whose piston movement is being sensed thereby to allow ease of comparison of the ignition interval with the exact position of the piston so that optimum spark advance can be determined and adjusted.

Moreover, the apparatus is provided with a valve-timing device comprising a valve-timing light connected to an electrical indicating means which can be used to sense the opening and closing of the exhaust and intake valves alternatively for turning on this valve timing-light during the intervals which correspond to intervals of time during which these valves are closed so that the ignition-timing function and valve-timing function can be carried out simultaneously with precise indications of the exact position of the piston during its stroke.

Other features and advantages of the apparatus, in accordance with the present invention, will be better understood as described in the following specification and appended claims, in conjunction with the following drawings in which:

FIG. 1 is a vertical view of the apparatus according to the present invention and is illustrative of the manner in which the apparatus is mounted on an engine during the checking and adjustment of the engine, FIG. 2 is an elevation view, partly in section, of the gauge portion of the apparatus shown in FIG. 1 and illustrates the gauge means for mechanically sensing the movement of the piston throughout its cycle or stroke;

FIG. 5 is an elevation perspective view of another embodiment of the type apparatus shown in FIG. 1;

While the present invention will be explained with respect to the application thereof to a spark-ignition engine and the spark advance and valve-timing checks thereon, it will be understood, that the invention or some of the principles thereof are equally applicable to an internal combustion of the diesel-cycle type wherein at least exhaust valves are provided for scavenging the engine so that valve-timing can be adjusted with respect to the position of a corresponding piston.

Figure 1:
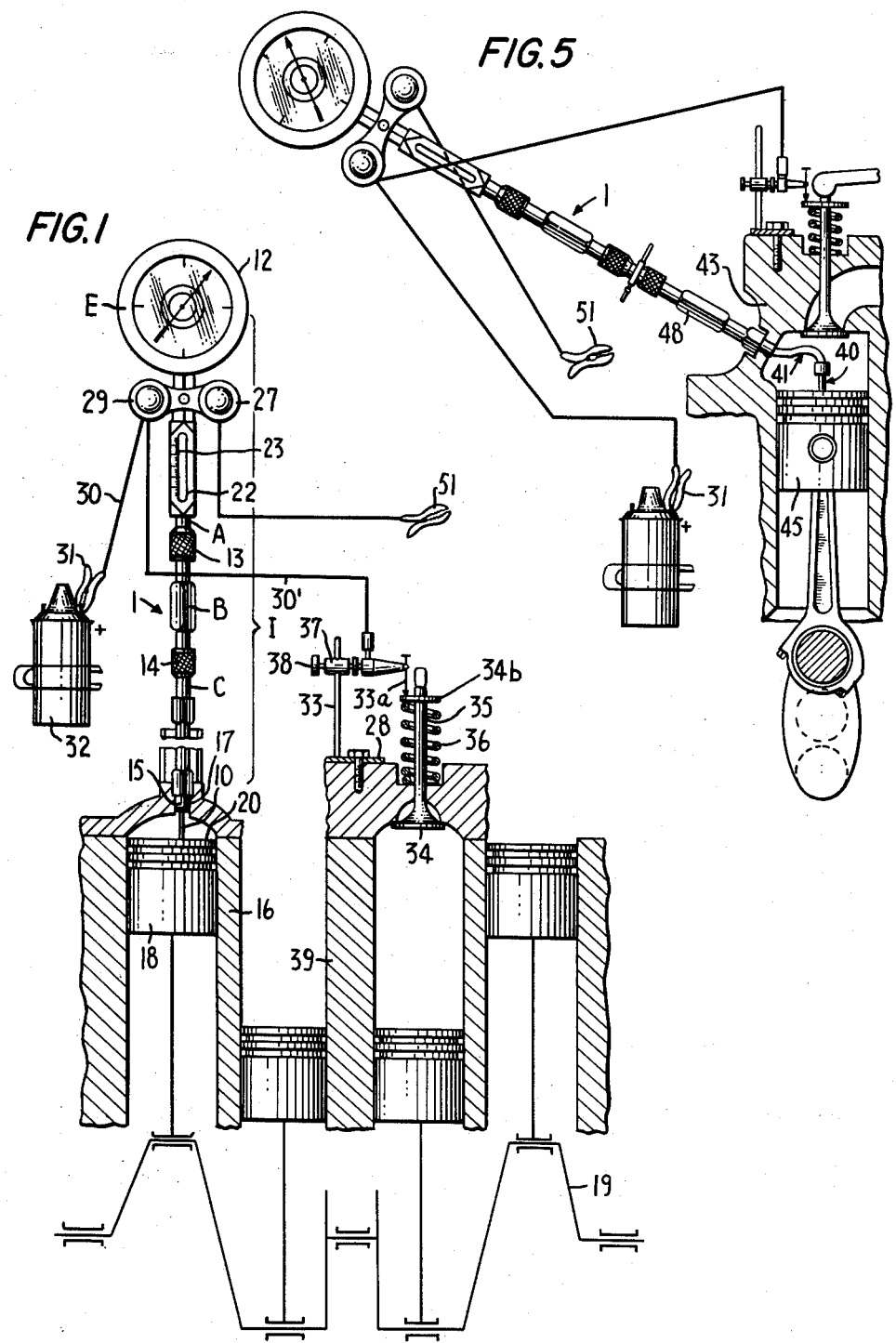
Figure 2:
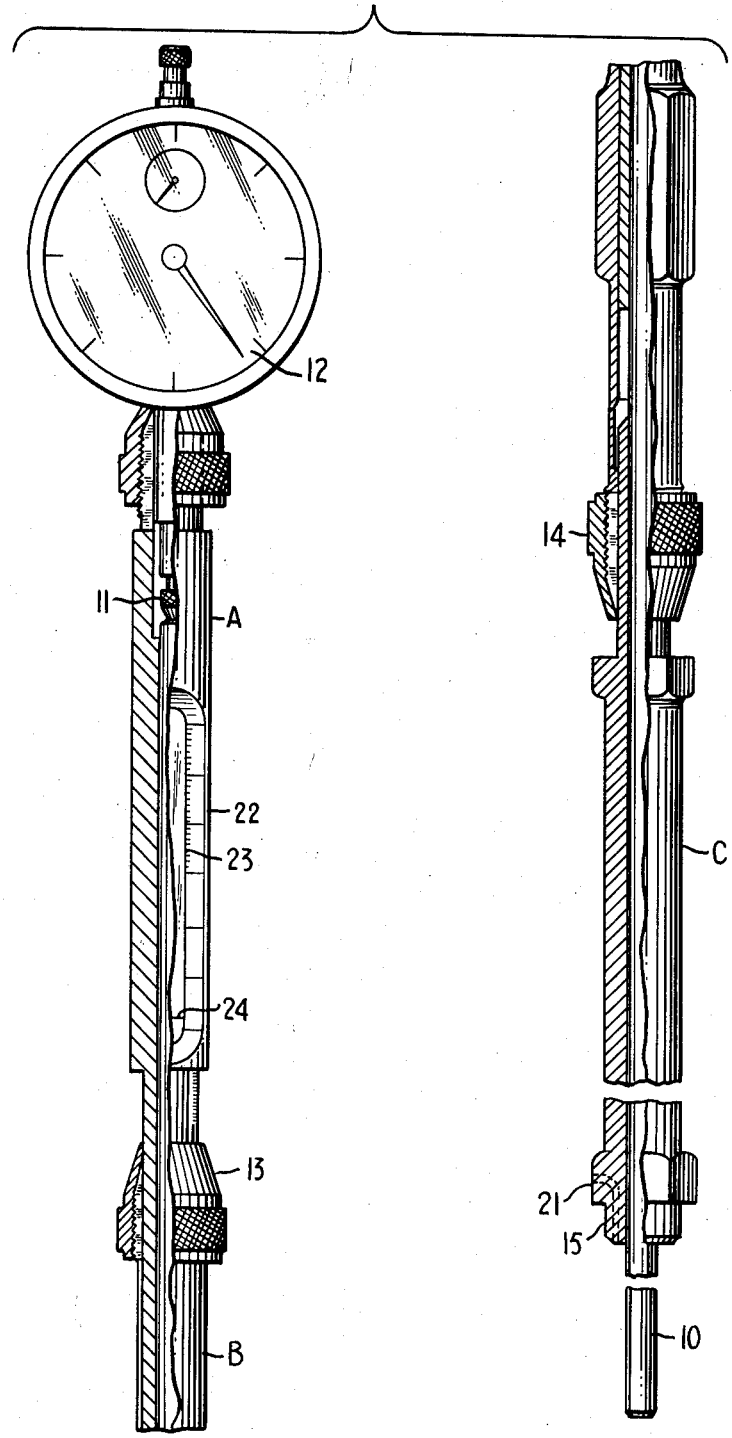
Figure 3:
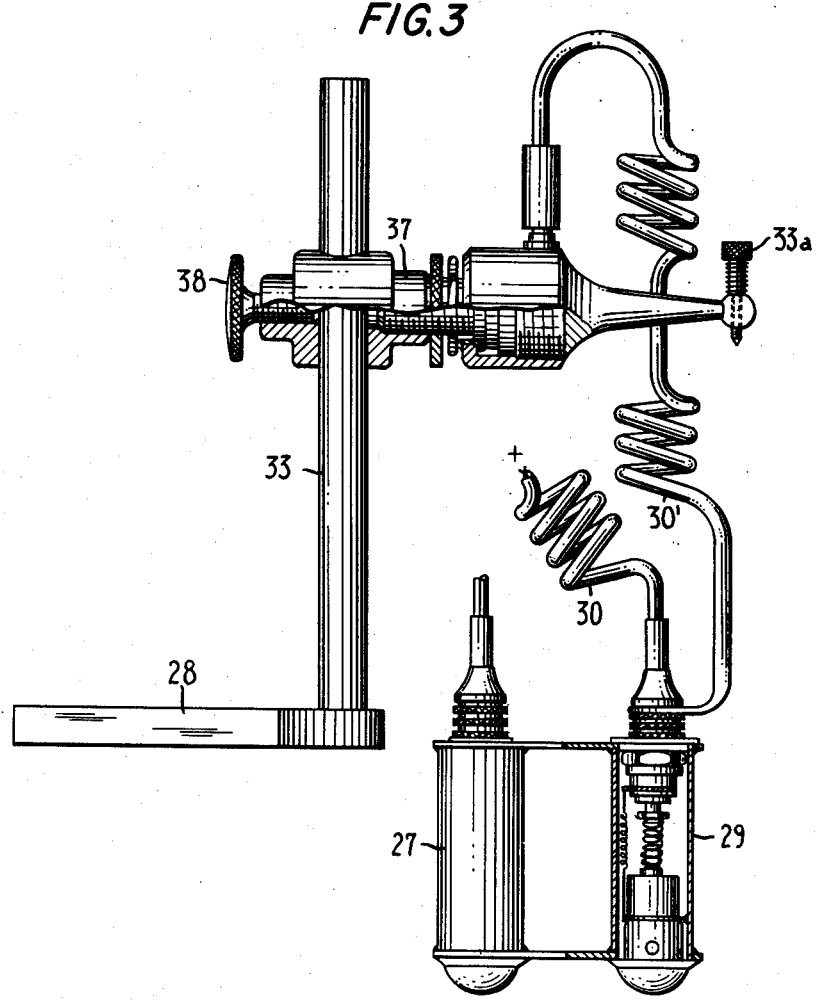
FIG. 3 is a detail elevation view of the valve-timing device of the apparatus shown in FIG. 1, according to the invention.
Figure 4:
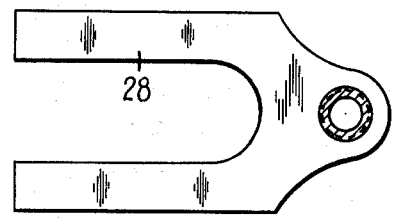
FIG. 4 is a plan view of the base of the mount of the device shown in FIG. 3.
Figure 6:
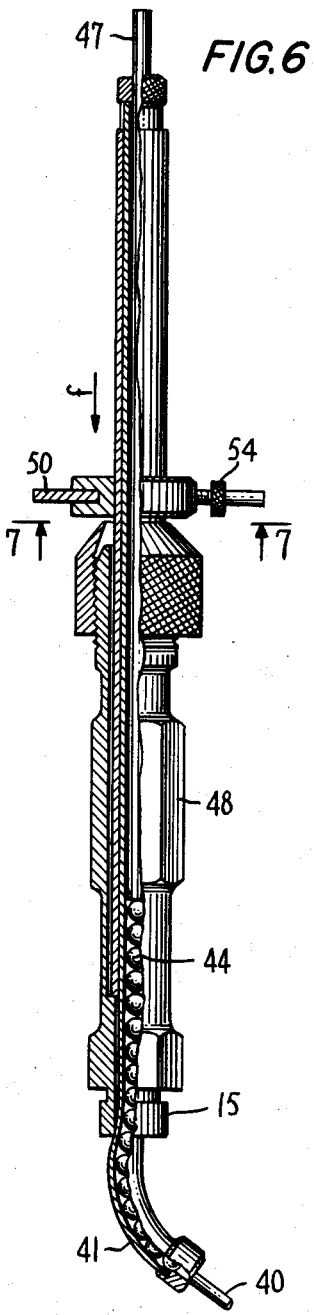
FIG. 6 is a fragmentary elevation view of an embodiment of a gauge, for the apparatus shown in FIG. 5, for mechanically sensing the position of the piston at all times.
Figure 7:
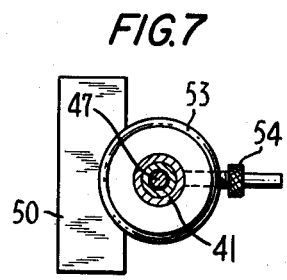
FIG. 7 is a plan view of a detail of the gauge shown in FIG. 6.

According to the drawings, FIGS. 1, 2 and 3, the apparatus denoted generally as I is provided with a tubular gauge 1. The tubular gauge 1 consists of three portions A, B and C which are arranged to telescope. The portion A is arranged to move axially internally of portion B which also moves telescopically or axially of portion C. A rod 10 extends axially through the three portions of the gauge and is freely movable therein for engaging a feeler 11 of a gauge member consisting of a gauge dial 12 suitably calibrated and graduated for indicating the position of a piston as later herein disclosed. The tubular gauge is provided with knurled clamping members 13 and 14 for locking the three portions of the gauge in fixed axial position when taking readings as to the exact position of a piston in an internal combustion engine, as later herein disclosed.

The lower portion C of the tubular gauge is provided with a threaded tip 15 for mounting on a cylinder head of a valve-in head cylinder 16 in a threaded hole providing communication into the interior of the cylinder subsequent to removal of a spark plug, not shown, therefrom. Mounted in this manner the rod 10 extends axially into the cylinder and is able to sense axial displacement of a piston 18 as it carries out its stroke upon jacking over crank shaft 19, as for example, by jacking it over manually.

The rod 10 engages the crown 20 of piston 18 and moves axially sensing the piston movement throughout its entire stroke. In order to preclude build-up of air-pressure internally of cylinder 16 during the jacking over operation a passageway 21 is provided in tip 15 allowing air to escape to atmosphere during the power stroke of piston 18. It can be seen therefore that by properly telescoping or extending the tubular gauge 1 the operator can cause the feeler 11 to make contact with the upper end of rod 10 when the piston is at bottom dead center and at top dead center.

The gauge is provided with means for visually indicating the length of the stroke of piston 18 consisting of a window 22 suitably provided with graduations 23. The rod 10 is provided with a reference mark 24 so that by making the window 22 sufficiently long the entire stroke of the piston can be observed. Moreover, the reference line 24 assists the operator in ascertaining when the piston is about to reach either top dead center or bottom dead center so that he can suitably control the length of the tubular gauge 1 by telescoping it or extending it axially thereby to position feeler 11 in proper position for actuation by rod 10 at the outermost portions of the stroke of the piston.

Dial means 12 can be rotated to "zeroize" it so that the dial will indicate a zero reading when the piston is at bottom dead center and top dead center and, accordingly, the displacement of the piston can be accurately sensed and indicated on gauge dial 12 as it approaches and leaves bottom dead center and top dead center.

The apparatus is provided with an ignition-timing device consisting of a light 27 mounted on gauge 1 as shown to which is connected a terminal, as for example, an alligator clip 51 which is connectable to a contact breaker, or high-tension distributor or a high-tension magneto (not shown) or whatever means are provided in the vehicle ignition system (not shown) which is operative to deliver periodic electrical impulses at the proper time in the engine cycle to the cylinder being checked with the apparatus.

The timing light 27 goes on upon provision of an electrical impulse corresponding to the impulse that would normally be provided to the spark plug in the cylinder being checked. It can readily be understood therefore that spark advance can be readily checked in conjunction with the gauge 1 and suitably adjusted by whatever means are provided on the ignition system to take place at the proper point of piston travel so that optimum spark advance is set and determined in accordance with the engine manufacturer's recommendations.

A valve-timing device is provided on the apparatus I consisting of a valve-timing light 29 mounted on gauge 1 to which is connected a lead 30 provided with a suitable terminal, as for example, an alligator clip 31 for connection to a plus terminal of a source of power 32 which may be a battery or induction coil on the vehicle. In order to sense the opening and closing of a valve, as for example, an exhaust valve 34, means are provided for turning on light 29 during intervals of time corresponding to intervals of closure of the valve. Accordingly, a standard 33 is provided mounted on a base 28 which can be suitably clamped on to a cylinder head of a cylinder being checked. It will be understood that for purposes of example the apparatus is shown checking an exhaust valve 34 of a cylinder 39, however, the apparatus is usable to check valve-timing on a cylinder, such as 16, whose piston stroke is being sensed.

The valve-timing device is provided with a contact member 33a for sensing the movement of washer or flange means 34b as it moves axially in conjunction with valve stem 35 compressing spring 36 or allowing it to extend under control of some engine means, as for example, a tappet, not shown. Contact 33a is externally threaded and can be suitably axially adjusted on an arm 37 which can be moved upwardly and downwardly on standard or pedestal 33 and locked in position by knob 38. Lead 30 and a lead 30' are connected to effect a series circuit in conjunction with light 29. It being understood that a circuit is established only when contact 33a is engaged by washer or flange means 34b indicating that spring 36 is extended and, accordingly, valve 34 is closed.

It can be readily understood that during a compression stroke of a piston, assuming that valve 34 is an exhaust valve, it is closed at the proper time during the compression stroke. Since, by means of gauge 1, the corresponding piston movement is sensed it can be seen, therefore, that when the corresponding piston is at top dead center the exhaust valve 34 is normally closed so that by "zeroizing" dial 12 with the piston at top dead center, the timing of corresponding exhaust valve 34 can be set.

Although the apparatus has been described with respect to sensing the opening and closing of an exhaust valve the same can be done with an intake valve and therefore the proper valve-timing and overlap, etc. can be determined and easily checked with respect to the proper linear position of a corresponding piston or angular position of the corresponding throw of a crank shaft. In this manner, optimum valve timing can be determined and suitably adjusted by adjusting the engine tappets, not shown, or whatever means are provided for adjustment on the type engine being checked.

According to the invention, several embodiments of the gauge 1 are provided. Other embodiments are shown in FIGS. 5 through 9 wherein elements corresponding to the elements discussed with respect to FIGS. 1 through 4 bear corresponding reference numerals for ease of comparison of the embodiments. According to the drawings, FIGS. 5 and 6, the gauge 1 is provided with a removable end portion consisting of a feeler rod 40 movable axially in one of a plurality of sheaths or tubes 41 having a plurality of different fixed angular shapes. The sheaths 41 are interchangeable with angularly different sheaths to take readings on engines in which a spark plug may be mounted on a side of the cylinder head 43, as shown in FIG. 5. A plurality of metallic balls 44 are provided internally of the tube 41 in use, which comes bent in a suitable shape for feeler rod 40 to engage normal to, and sense the travel of, a piston 45' for transmitting the piston travel around the angle of tube 41 by said balls. Tube 41 is rigid with member 48 which is mountable on engine head 43 by a threaded tip 15. The gauge is provided with a second feeler 47 (FIG. 6) corresponding to rod 10 of FIG. 1 which engages a dial feeler such as 11 (FIG. 2). A level 50, mounted on a ring 53 through which tube 41 passes, is used to determine that rod 40 (FIG. 5) is directed downward normal to the piston and parallel to the cylinder walls and not canted with respect thereto, around the longitudinal axis of the tubular gauge. The level is adjustable around the longitudinal axis of the member 48 for the level bubble to be in mid-position when the rod 40 is normal to the piston 45 and locked in position by the screw 54. An interchangeable sheath 41 can be constructed to allow sensing of pistons in cylinders on which the spark plug holes are disposed in relatively hard to reach positions or places and at all angles to the cylinders. The apparatus is thus usable on all types of engines.

Figure 8:
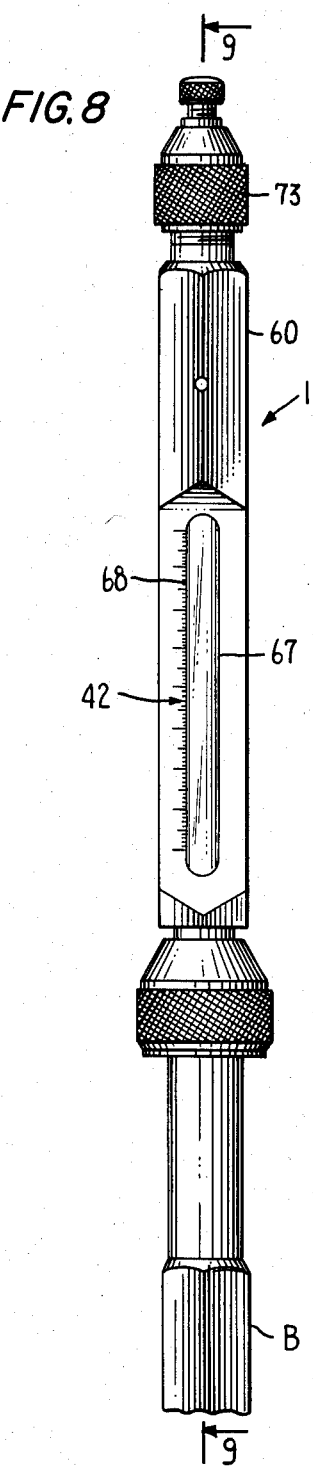
FIG. 8 is an elevation view of a hydraulic gauge for sensing and indicating visually the position of a piston.
Figure 9:
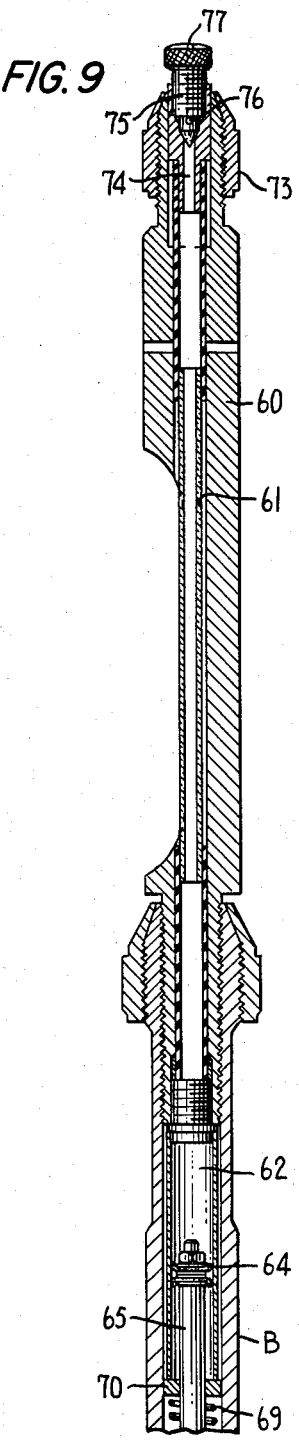
FIG. 9 is a side view partly in section of the gauge shown in FIG. 8.

The apparatus, according to the invention, can be manufactured quite inexpensively as indicated heretofore and can be provided with hydraulic means replacing the dial 12 of gauge 1. Such an embodiment is shown in FIGS. 8 and 9 in which portion A is replaced by a tubular member 60 in which is provided with a very narrow passageway 61 in communication with a chamber 62 filled with a hydraulic fluid, preferably colored. Chamber 62 is formed as a part of the upper end of a central bore in portion B in which a piston 64 is reciprocably driven by a rod 65 which senses piston movement in a manner similar to rod 10 in the embodiment shown in FIG. 1.

Upon axial displacement of rod 65 as it senses the piston movement liquid is pumped from chamber 62 into passageway 61. The hydraulic liquid level can be viewed through a window 67 suitably graduated with graduations 68 to indicate the axial travel of the piston throughout its entire stroke and to visually indicate it when the piston being sensed is at top and bottom dead centers.

A spring 69 bearing on shoulders 70 of rod 65 constantly biases rod 65 into a piston engaging position. It being understood that piston 64 and rod 65 are displaced axially of member B as the piston being sensed carries on its travel.

In order to insure sensitivity of the gauge and accuracy thereof, the passageway 61 has a substantially reduced diameter with respect to the diameter of the internal bore of member B which corresponds to the internal diameter of chamber 62 so that a very slight movement of piston 64 will cause a relatively large axial displacement of fluid or liquid in passageway 61 so that it can be easily detected and a level change detected and read. A suitable ratio of diameters is 1 to 10. Moreover, the gauge 1 is provided with a bleeder valve portion 73 in which a narrow, air-escape or bleeder passageway 74 in communication with the column of liquid in passageway 61 is provided. A needle valve 75 provided with an axial passage 76 in communication with the atmosphere through a passageway 77 is movable into a seated position as shown in FIG. 9 and can be unseated to allow entrapped air above the column of liquid to escape through passageways 76 and 77 to atmosphere and is returned to a seated position once the bleeding function has taken place to preclude escape of liquid from passageway 61. In this manner the possibility of compressing air entrapped above the column of liquid in passageway 61, which would reduce the accuracy of the apparatus, is eliminated.

It is readily apparent that the apparatus provides a simple and inexpensive, as well as positive means, for carrying out engine analysis and adjustment of valve timing and ignition timing or spark advance easily and accurately in internal combustion engines. Regardless of engine wear proper timing may be easily carried out.

While preferred embodiments of the invention have been shown and described, it will be understood that many modifications and changes can be made within the scope of the invention.

What I claim and desire to secure by Letters Patent is:

1. Engine operation analysis apparatus for checking ignition and valve timing on cyclically operable internal combustion engines having at least one cylinder with an intake valve and an exhaust valve, a piston reciprocally driven in the cylinder and an ignition system having means operative to deliver periodic electrical impulses, said apparatus comprising, in combination, a tubular gauge comprising, telescoping hollow members, one of which is attachable to the cylinder and in communication with the interior thereof, and flexible feeler means axially mounted in said hollow members, and extending into the cylinder when the gauge is mounted thereon to mechanically engage the piston normal thereto, said flexible feeler means for following and sensing the true distance of piston travel, and the top and bottom dead center positions of the piston; means for securing said flexible feeler means in said hollow members; visual indicating means on said gauge cooperative with said flexible feeler means and actuated thereby, for indicating the true travel of the piston including the top and bottom dead center positions thereof; a valve-timing indicating device comprising a valve-timing light mounted on said gauge for visually indicating the times during which the intake and exhaust valves are completely closed for easily comparing with the indicated position of the piston during said times; means cooperative alternatively with said exhaust and intake valves for turning on said light during said times and turning it off during other times of the engine operational cycle, an ignition-timing indicating device comprising means electrically connectable to said ignition means providing the periodic impulses, including a second light for visually indicating the time of said impulses relative to the position of said valves as indicated by said first light and the piston as indicated by said visual indicating means.

2. Engine operation analysis apparatus according to claim 1, in which said means to turn on said valve-timing light comprises an open electrical circuit connected to said valve-timing light, an electrical contact disposed for alternatively sensing closure of said valves and in position to make contact with said valves alternatively when closed to complete the open circuit and cause said valve-timing light to go on.

3. Engine operation analysis apparatus as described in claim 1 characterized in that said flexible feeler means comprises a rigid tube for mounting in extension of said telescoping hollow members, said tube having two ends, one said end being coaxial with said hollow members and the other said end having its longitudinal center axis normal to said piston, said tube extending between its tube ends and bringing said axes into congruency, feeler rods respectively mounted in the ends of the rigid tube, and a plurality of balls adapted to fit in said rigid tube and respectively slidable axially therein intermediate said feeler rods and stacked therebetween in continuous contact one with another, and with the feeler rods, whereby regardless of the angular shape of the rigid tubes in the region of the balls reciprocable motion of one feeler rod at said other end of the rigid tube is freely transmitted to the feeler rod at said one end.

4. Engine operation analysis apparatus as described in claim 1 characterized in that said visual indicating means for indicating piston travel and position comprises a telescopic hollow member containing a liquid, piston means actuated by a feeler rod for axially displacing the liquid in said hollow member when said feeler rod is axially displaced by said piston, means on said hollow member for viewing the liquid level and a scale adjacent said viewing means calibrated and graduated for indicating the position of the piston corresponding to the level of the liquid.

5. Engine operation analysis apparatus as described in claim 3 characterized in that said flexible feeler means include a ring secured around a telescoping hollow member, and said tube mounted therein, and a level mounted on said ring for orienting said tube with respect to said cylinder when said tube is directed therein, said ring being adjustable around said hollow member for said level to indicate the horizontal when the feeler rod at said other end of said rigid tube is normal to said piston.

References Cited in the file of this patent

UNITED STATES PATENTS

| | | |
|---|---|---|
| 1,655,615 | Kreisel | Jan. 10, 1928 |
| 2,426,955 | Stroup | Sept. 2, 1947 |
| 2,664,012 | Newsome | Dec. 29, 1953 |